US010995664B2

(12) United States Patent
Matsukuma et al.

(10) Patent No.: US 10,995,664 B2
(45) Date of Patent: *May 4, 2021

(54) COMPRESSED AIR ENERGY STORAGE AND POWER GENERATION METHOD AND COMPRESSED AIR ENERGY STORAGE AND POWER GENERATION DEVICE

(71) Applicant: Kobe Steel, Ltd., Hyogo (JP)

(72) Inventors: Masaki Matsukuma, Hyogo (JP); Hiroki Saruta, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,055

(22) Filed: Sep. 6, 2019

(65) Prior Publication Data

US 2019/0390599 A1 Dec. 26, 2019

Related U.S. Application Data

(62) Division of application No. 15/574,453, filed as application No. PCT/JP2016/063578 on May 2, 2016, now Pat. No. 10,480,410.

(30) Foreign Application Priority Data

May 18, 2015 (JP) ................... 2015-101283

(51) Int. Cl.
*F02C 6/16* (2006.01)
*F02C 1/04* (2006.01)
(Continued)

(52) U.S. Cl.
CPC ............... *F02C 6/16* (2013.01); *F01D 17/08* (2013.01); *F02C 1/04* (2013.01); *F02C 1/05* (2013.01);
(Continued)

(58) Field of Classification Search
CPC ...... F02C 6/16; F02C 1/04; F02C 1/05; F02C 7/143; F02C 9/24; F01D 17/08;
(Continued)

(56) References Cited

U.S. PATENT DOCUMENTS

2007/0255459 A1  11/2007  Althaus
2010/0251712 A1*  10/2010  Nakhamkin ............ F02C 6/16
                                                                                60/659
(Continued)

FOREIGN PATENT DOCUMENTS

JP    2012-097737 A    5/2012
JP    2013-512410 A    4/2013
(Continued)

OTHER PUBLICATIONS

International Search Report issued in PCT/JP2016/063578; dated Jul. 5, 2016.
(Continued)

*Primary Examiner* — Mark A Laurenzi
*Assistant Examiner* — Xiaoting Hu
(74) *Attorney, Agent, or Firm* — Studebaker & Brackett PC (57) ABSTRACT

In a compressed air energy storage and power generation device, a compressed air energy storage and power generation method defines, as a reference storage value, a storage value indicating that a storage amount of air in an accumulator tank is in a predetermined intermediate state. At the reference storage value, at least one of a motor and a generator rotates at a rated rotation speed. When a storage value indicating a current storage amount in the accumulator tank is larger than the reference storage value, at least one of the motor and the generator is controlled to rotate at equal to or less than the rated rotation speed. When the storage value indicating the current storage amount in the accumu-
(Continued)

lator tank is smaller than the reference storage value, at least one of the motor and the generator is controlled to rotate at equal to or more than the rated rotation speed and equal to or less than a maximum permissible rotation speed.

7 Claims, 5 Drawing Sheets (51) Int. Cl.
*F01D 17/08* (2006.01)
*F02C 1/05* (2006.01)
*F01D 19/00* (2006.01)
*F02C 9/24* (2006.01)
*H02J 15/00* (2006.01)
*F02C 7/143* (2006.01)

(52) U.S. Cl.
CPC ............... *F02C 9/24* (2013.01); *F01D 19/00* (2013.01); *F02C 7/143* (2013.01); *F05D 2260/211* (2013.01); *F05D 2270/02* (2013.01); *F05D 2270/301* (2013.01); *F05D 2270/304* (2013.01); *F05D 2270/312* (2013.01); *H02J 15/006* (2013.01); *Y02E 50/10* (2013.01); *Y02E 60/16* (2013.01); *Y02E 70/30* (2013.01)

(58) Field of Classification Search
CPC ............... F01D 19/00; F05D 2270/02; F05D 2270/304; F05D 2270/301; F05D 2270/312; H02J 15/006

See application file for complete search history.

(56) References Cited

U.S. PATENT DOCUMENTS

| 2011/0127004 A1 | 6/2011 | Freund et al. |
| 2012/0036853 A1 | 2/2012 | Kidd et al. |
| 2012/0102937 A1 | 5/2012 | Anikhindi et al. |
| 2014/0026584 A1* | 1/2014 | Naeve ..................... F02C 6/16 60/659 |

FOREIGN PATENT DOCUMENTS

| JP | 2013-536357 A | 9/2013 | |
| WO | WO-2010125568 A2 * | 11/2010 | ............... F03D 9/28 |

OTHER PUBLICATIONS

The extended European search report issued by the European Patent Office dated Jan. 4, 2019, which corresponds to European Patent Application No. 16796300.8 and is related to U.S. Appl. No. 15/574,453.

* cited by examiner

COMPRESSED AIR ENERGY STORAGE AND POWER GENERATION METHOD AND COMPRESSED AIR ENERGY STORAGE AND POWER GENERATION DEVICE

CROSS-REFERENCE TO RELATED APPLICATIONS

This is a divisional application from a national phase U.S. patent application Ser. No. 15/574,453 filed on Nov. 15, 2017 with an international filing date of May 2, 2016, which claims priority of Japanese Patent Application No. 2015-101283 filed on May 18, 2015 the contents of which are incorporated herein by reference.

TECHNICAL FIELD

The present invention relates to a compressed air energy storage and power generation method and a compressed air energy storage and power generation device.

BACKGROUND ART

In power generation using solar energy, such as solar power generation and solar thermal power generation, a power generation output thereof is affected by conditions of sunshine of that day, and fluctuates to a large extent. For example, the power generation cannot be performed at night, and the power generation output largely decreases on rainy and cloudy days. Moreover, when the conditions of sunshine from dawn to sunset are such conditions of sunshine as "clear and then cloudy", the power generation output largely fluctuates within that day.

In wind power generation using wind turbines, a power generation output thereof largely fluctuates due to changes in a wind direction and a wind force on that day. For example, in such a power generation facility such as a wind farm in which a plurality of wind turbines are gathered, the power generation outputs of the respective wind turbines are added to one another, whereby short-cycle fluctuations of the power generation can be smoothed; however, the fluctuations of the power generation output thereof cannot be avoided when the power generation output is viewed as a whole.

As a technology for smoothing such a fluctuating and unstable power generation output as described above, typical is a storage battery that stores electricity when surplus generated power occurs and makes up electricity when power is insufficient. Moreover, there is known a technology called compressed air energy storage (CAES) for storing surplus generated power as an air pressure converted as an alternative of electricity when such surplus generated power occurs and then reconverting the air pressure into the electricity by an air turbine generator and the like when necessary.

For example, technologies related to such smoothing, which use the technology of CAES as described above, are disclosed in JP 2012-97737 A, JP 2013-512410 A, and JP 2013-536357 A. In the conventional technologies disclosed in these documents, energy storage efficiency is enhanced by recovering heat generated in a compression step by a compressor.

SUMMARY OT THE INVENTION

Problems to be Solved by the Invention

In any of the conventional technologies disclosed in the above-mentioned documents, it is premised that compressed air is stored in a large storage space such as an underground cave by using unnecessary power at an off-peak time. Hence, any of the conventional technologies does not have an object to smooth the power, which fluctuates in a relatively short cycle, in the power generation using such renewable energy as sunlight and wind force.

Moreover, any of the conventional technologies disclosed in the above-mentioned documents do not disclose the fact that, when the power to be absorbed by the compressor changes frequently in the relatively short cycle, an amount of such absorbed power is changed by varying dynamic power to drive the compressor. In these technologies, it is premised that centrifugal-type compressor and expander are used, and rotation speeds of the compressor and the expander cannot be frequently changed in order to stably operate these.

In a compressed air energy storage and power generation device, it is extremely important to reduce an energy loss in a charging step and a discharging step as much as possible, that is, to increase charge/discharge efficiency. Moreover, it is important to expand a range where the compressed air energy storage and power generation device can operate with a rated input or a rated output as much as possible. For this purpose, it is preferable to maintain an amount of power to be absorbed (charged) according to a request from a power plant and an amount of power to be generated (discharged) according to a request from a power system individually at predetermined values.

It is an object of the present invention to provide a compressed air energy storage and power generation method, which is capable of highly maintaining the charge/discharge efficiency as a whole even when an amount of air stored in an accumulator tank fluctuates from a reference storage value, and is capable of expanding a pressure range of the accumulator tank, where the compressed air energy storage and power generation device can operate by means of the predetermined rated input or rated output.

Means for Solving the Problems

A first aspect of the present invention provides a compressed air energy storage and power generation method, comprising: driving an electric motor by fluctuating input power; compressing air by a compressor mechanically connected to the electric motor; storing the compressed air, which is supplied from the compressor, in an accumulator tank; driving an expander by the compressed air supplied from the accumulator tank; and generating power by a generator mechanically connected to the expander, wherein the compressed air energy storage and power generation method comprises: defining, as a reference storage value, a storage value indicating that a storage amount of the air in the accumulator tank is in a predetermined intermediate state; at the reference storage value, controlling at least one of the electric motor and the generator to rotate at a rated rotation speed; when a storage value indicating a current storage amount in the accumulator tank is larger than the reference storage value, controlling at least one of the electric motor and the generator to rotate at equal to or less than the rated rotation speed; and when the storage value indicating the current storage amount in the accumulator tank is smaller than the reference storage value, controlling at least one of the electric motor and the generator to rotate at equal to or more than the rated rotation speed and equal to or less than a maximum permissible rotation speed.

In this way, in the case of smoothing the renewable energy, even when such an amount of the air in the accumulator tank fluctuates from the reference storage value, the rotation speed of the electric motor or the generator is controlled, and the electric motor or the generator can be operated efficiently. That is, a pressure range of the accumulator tank, where a predetermined input or output capable of such an efficient operation is exerted, can be expanded, and accordingly, the charge/discharge efficiency of the whole of the system can be highly maintained. Here, the predetermined intermediate state of the reference storage value indicates a state in which an air storage amount of the accumulator tank is appropriate and a predetermined input or output, which is capable of efficient operation, is exerted.

When the electric motor is controlled, it is preferable that if the storage value indicating the current storage amount in the accumulator tank is larger than the reference storage value, then the electric motor is rotated at equal to or less than the rated rotation speed so as to maintain a rated input, and if the storage value indicating the current storage amount in the accumulator tank is smaller than the reference storage value, then the electric motor is rotated at equal to or more than the rated rotation speed and equal to or less than the maximum permissible rotation speed so as to maintain the rated input.

When the generator is controlled, it is preferable that if the storage value indicating the current storage amount in the accumulator tank is larger than the reference storage value, then the generator is rotated at equal to or less than the rated rotation speed so as to maintain a rated output, and if the storage value indicating the current storage amount in the accumulator tank is smaller than the reference storage value, the generator is rotated at equal to or more than the rated rotation speed and equal to or less than the maximum permissible rotation speed so as to maintain the rated output.

In this way, in the case of smoothing the renewable energy, even when the amount of air in the accumulator tank fluctuates from the reference storage value, the rated input or the rated output, which is capable of the efficient operation, can be maintained within a fixed range. In general, a rotating electric instrument (rotating electric machine) for use in the electric motor or the generator is designed so that efficiency thereof can be improved in a rated state, and accordingly, an operation range at the predetermined rated input or rated output can be expanded.

It is preferable that a maximum capacity at which the air is storable in the accumulator tank is defined as 100%, a minimum capacity at which power is generatable by the compressed air stored in the accumulator tank is defined as 0%, and the reference storage value is set within a range of 50% to 75% of the maximum capacity.

In this way, even when the amount of air stored in the accumulator tank fluctuates from the reference storage value, a time while the air energy storage and power generation device can be operated at the rated input or the rated output can be lengthened, and accordingly, the charge/discharge efficiency as a whole can be highly maintained. Specifically, a region where a frequency at which the compressed air energy storage and power generation device is used is assumed to be highest stays within a range from 50% to 75%, and accordingly, the reference storage value is set within this range, whereby a time while the amount of air stored in the accumulator tank stays in a vicinity of the reference storage value can be lengthened. Here, "maximum storable capacity" refers to a maximum capacity of the air to be used in a usual operation, and is not in a state in which the air is stored to a pressure resistance limit of the accumulator tank. Meanwhile, "minimum generatable capacity" refers to a state in which the air is not used or the use thereof is not preferable in the usual operation, and is not a state in which it becomes completely impossible to generate power. This is because, if just a small amount of the pressure remains in the accumulator tank to an extent of being suppliable to the expander, then the power generation is possible.

It is possible that heat exchange is performed between a heat medium and the compressed air, which is compressed by the compressor, in a first heat exchanger, and a temperature of the heat medium is raised; the heat medium whose temperature is raised in the first heat exchanger is stored in a heat medium tank; and in a second heat exchanger, the heat exchange is performed between the heat medium supplied from the heat medium tank and the compressed air supplied from the accumulator tank, and a temperature of the compressed air is raised, and is supplied to the expander.

In this way, with this configuration, the heat generated in the compressor is recovered in the first heat exchanger, and in the second heat exchanger, the heat is returned to the air immediately before being expanded by the expander, whereby the charge/discharge efficiency can be enhanced. In a usual compressed air energy storage and power generation device, such heat generated in the compressor is supplied into the accumulator tank together with the compressed air. Then, the heat is released from the accumulator tank to the atmosphere, and an energy loss occurs. In order to prevent this, before the compressed air is supplied to the accumulator tank, the heat is recovered in advance, and the temperature of the compressed air stored in the accumulator tank is brought close to the ambient temperature. As described above, the energy loss due to the heat release in the accumulator tank can be prevented.

A second aspect of the present invention provides a compressed air energy storage and power generation device comprising: an electric motor driven by fluctuating input power; a compressor that is mechanically connected to the electric motor and compresses air; an accumulator tank that is fluidly connected to the compressor and stores the air compressed by the compressor; an expander that is fluidly connected to the accumulator tank and is driven by the compressed air supplied from the accumulator tank; a generator that is mechanically connected to the expander and generates power to be supplied to a demand destination; and a control device that defines, as a reference storage value, a storage value indicating that a storage amount of the air in the accumulator tank is in a predetermined intermediate state, at the reference storage value, controls at least one of the electric motor and the generator to rotate at a rated rotation speed, when a storage value indicating a current storage amount in the accumulator tank is larger than the reference storage value, controls at least one of the electric motor and the generator to rotate at equal to or less than the rated rotation speed, and when the storage value indicating the current storage amount in the accumulator tank is smaller than the reference storage value, controls at least one of the electric motor and the generator to rotate at equal to or more than the rated rotation speed and equal to or less than a maximum permissible rotation speed.

In the case of controlling the electric motor, it is preferable that if the storage value indicating the current storage amount in the accumulator tank is larger than the reference storage value, then the control device controls the electric motor to rotate at equal to or less than the rated rotation speed so as to maintain a rated input, and if the storage value indicating the current storage amount in the accumulator tank is smaller than the reference storage value, then the control device controls the electric motor to rotate at equal to or more than the rated rotation speed and equal to or less than the maximum permissible rotation speed so as to maintain the rated input.

In the case of controlling the generator, it is preferable that if the storage value indicating the current storage amount in the accumulator tank is larger than the reference storage value, the control device controls the generator to rotate at equal to or less than the rated rotation speed so as to maintain a rated output, and if the storage value indicating the current storage amount in the accumulator tank is smaller than the reference storage value, the control device controls the generator to rotate at equal to or more than the rated rotation speed and equal to or less than the maximum permissible rotation speed so as to maintain the rated output.

Moreover, it is preferable that the control device defines a maximum capacity at which the air is storable in the accumulator tank as 100%, defines a minimum capacity at which power is generatable by the compressed air stored in the accumulator tank as 0%, and sets the reference storage value within a range of 50% to 75% of the maximum capacity.

It is preferable that the compressed air energy storage and power generation device further include: a first heat exchanger for performing heat exchange between a heat medium and the compressed air compressed by the compressor, and raising a temperature of the heat medium; a heat medium tank that stores the heat medium whose temperature is raised in the first heat exchanger in a heat medium tank; and a second heat exchanger for performing the heat exchange between the heat medium supplied from the heat medium tank and the compressed air supplied from the accumulator tank, raising a temperature of the compressed air, and supplying the air to the expander.

In accordance with the present invention, in the case of smoothing the renewable energy by the compressed air energy storage and power generation device, even when the amount of air stored in the accumulator tank fluctuates from the reference storage value, the charge/discharge efficiency as a whole can be highly maintained. Moreover, the pressure range of the accumulator tank, in which the compressed air energy storage and power generation device can operate by means of the predetermined rated input or rated output, can be expanded.

DESCRIPTION OF EMBODIMENTS

Hereinafter, embodiments of the present invention will be described with reference to the accompanying drawings.

First Embodiment

Figure 1:
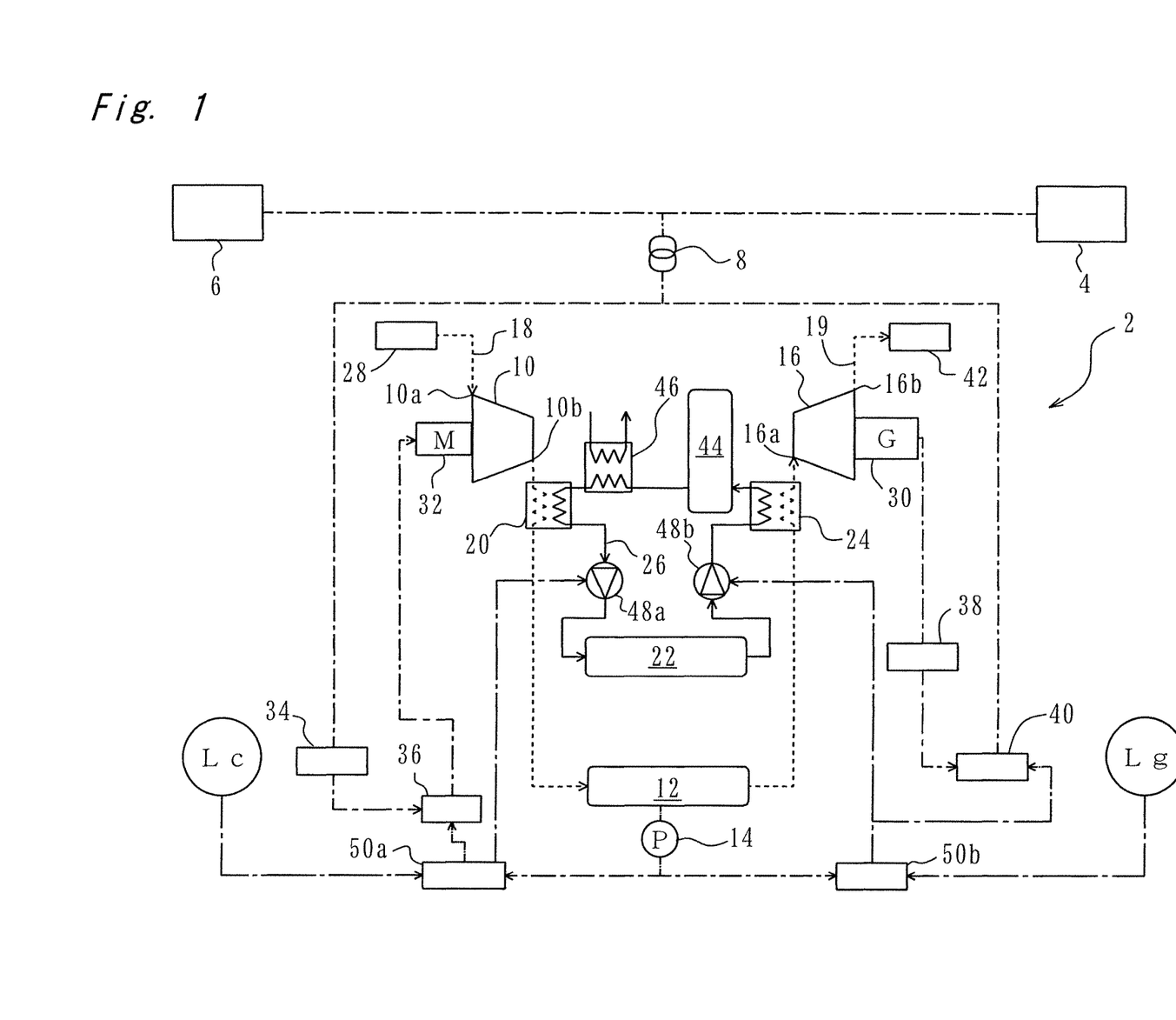
FIG. 1 is a schematic configuration diagram according to a first embodiment of the present invention.

FIG. 1 shows a schematic configuration diagram of a compressed air energy storage (CAES) power generation device 2. In the case of generating power by using renewable energy, the CAES power generation device 2 of this embodiment smoothes a fluctuation of an output to a power system 4 as a demand destination, and in addition, outputs power matched with a fluctuation of demand power in the power system 4. The CAES power generation device 2 smoothes power, which is supplied from a power plant 6 by renewable energy, such as a wind power plant and a solar power plant, via a power receiving/transmitting facility 8 composed of a transformer and the like, and then outputs the power to the power system 4 as the demand destination.

Referring to FIG. 1, a description will be made of a configuration of the CAES power generation device 2.

The CAES power generation device 2 includes an air path and a heat medium path. A compressor 10, an accumulator tank 12 and an expander 16 are mainly provided in the air path, and these are fluidly connected to one another by an air pipes 18 and 19, and air flows therein (see broken lines in FIG. 1). A first heat exchanger 20, a heat medium tank 22 and a second heat exchanger 24 are mainly provided in the heat medium path, and these are fluidly connected to one another by a heat medium pipe 26, and a heat medium flows therein (see solid lines in FIG. 1).

First, the air path will be described with reference to FIG. 1. In the air path, air sucked through an intake filter 28 is compressed by the compressor 10, and is stored in the accumulator tank 12. The compressed air stored in the accumulator tank 12 is supplied to the expander 16, and is used for power generation of a generator 30.

The compressor 10 is of a screw type, and includes a motor (electric motor) 32. The motor 32 is mechanically connected to the compressor 10. Power (input power) generated by the power plant 6 is supplied to the motor 32 via a converter 34 and an inverter 36, the motor 32 is driven by this power, and the compressor 10 is activated. A discharge port 10b of the compressor 10 is fluidly connected to the accumulator tank 12 through the air pipe 18. When the compressor 10 is driven by the motor 32, the compressor 10 sucks air from a suction port 10a, compresses the sucked air, discharges the compressed air from the discharge port 10b, and sends the compressed air with pressure to the accumulator tank 12. In this embodiment, the compressor 10 is of a screw type; however, may be of a scroll type. Such a compressor 10 of a turbo type or the like, whose behavior becomes unstable due to a fluctuation of a rotation speed thereof, is not suitable for the present invention; however, is not inapplicable thereto. In this embodiment, the number of compressors 10 is one; however, a plurality of the compressors 10 may be installed.

The accumulator tank 12 stores the compressed air sent with pressure from the compressor 10. Hence, energy can be stored as the compressed air in the accumulator tank 12. The accumulator tank 12 is fluidly connected to the expander 16 through the air pipe 19. Hence, the compressed air stored in the accumulator tank 12 is supplied to the expander 16. A storage pressure and storage capacity of the compressed air in the accumulator tank 12 are determined by an amount of the stored power. However, such a capacity of the accumulator tank 12 is generally large, and accordingly, in that case, it is difficult to insulate the accumulator tank 12 from the outside air from a viewpoint of cost. Hence, a storage temperature of the compressed air in the accumulator tank 12 is set to substantially the same level as the atmospheric temperature, or a little higher or lower than the atmospheric temperature in order to avoid a heat loss due to a release into the atmosphere. A pressure sensor 14 is installed for the accumulator tank 12, and can measure a pressure of the compressed air in the inside of the accumulator tank 12.

The expander 16 is of a screw type, and includes the generator 30. The generator 30 is mechanically connected to the expander 16. The expander 16 supplied with the compressed air from a suction port 16a through the air pipe 19 is activated by the compressed air thus supplied, and drives the generator 30. The generator 30 is electrically connected to the external power system 4 (see an alternate long and short dashed line in FIG. 1), and the generated power is supplied to the power system 4 as the demand destination via the converter 38 and the inverter 40. Moreover, the air expanded by the expander 16 is emitted from the discharge port 16b via an exhaust silencer 42. In this embodiment, the expander 16 is of a screw type; however, may be of a scroll type. Such an expander 16 of a turbo type or the like, whose behavior becomes unstable due to a fluctuation of a rotation speed thereof, is not suitable for the present invention; however, is not inapplicable thereto. Moreover, in this embodiment, the number of such expanders 16 is one; however, a plurality of the expanders 16 may be installed.

Next, the heat medium path will be described with reference to FIG. 1. In the heat medium path, heat generated in the compressor 10 is recovered to the heat medium in the first heat exchanger 20. Then, the heat medium that has recovered the heat is stored in the heat medium tank 22, and in the second heat exchanger 24, the heat is returned to the compressed air before being expanded in the expander 16. The heat medium whose temperature has fallen by such a heat exchange in the second heat exchanger 24 is supplied to a heat medium return tank 44. Then, the heat medium is supplied from the heat medium return tank 44 to the first heat exchanger 20 one more time, and the heat medium circulates. A type of the heat medium is not particularly limited, and for example, mineral oil or a glycol-based heat medium may be used.

The first heat exchanger 20 is provided in the air pipe 18 extending from the compressor 10 to the accumulator tank 12 in the air path, and in the heat medium pipe 26 extending from the heat medium return tank 44 to the heat medium tank 22 in the heat medium path. Hence, the first heat exchanger 20 performs the heat exchange between the compressed air supplied from the accumulator tank 12 and the heat medium supplied from the heat medium return tank 44, and recovers compressed heat, which is generated by the compression by the compressor 10, to the heat medium. That is, in the first heat exchanger 20, a temperature of the compressed air falls, and such a temperature of the heat medium rises. Here, the heat medium whose temperature has risen is supplied to the heat medium tank 22 through the heat medium pipe 26.

The heat medium tank 22 is a steel tank whose periphery is covered with a heat insulating material insulated from the atmosphere. In the heat medium tank 22, the heat medium whose temperature has risen by the first heat exchanger 20 is stored. The heat medium stored in the heat medium tank 22 is supplied to the second heat exchanger 24 through the heat medium pipe 26.

The second heat exchanger 24 is provided in the air pipe 19 extending from the accumulator tank 12 to the expander 16 in the air path, and in the heat medium pipe 26 extending from the heat medium tank 22 to the heat medium return tank 44 in the heat medium path. Hence, the second heat exchanger 24 performs the heat exchange between the compressed air supplied from the accumulator tank 12 and the heat medium supplied from the heat medium tank 22, and heats the compressed air before the expansion by the expander 16. That is, in the second heat exchanger 24, the temperature of the compressed air rises, and the temperature of the heat medium falls. The heat medium whose temperature has fallen by the second heat exchanger 24 is supplied to the heat medium return tank 44 through the heat medium pipe 26.

The heat medium return tank 44 stores the heat medium whose temperature has fallen by performing the heat exchange in the second heat exchanger 24. Hence, the heat medium in the heat medium return tank 44 is usually lower in temperature than the heat medium in the heat medium tank 22. The heat medium stored in the heat medium return tank 44 is supplied to the first heat exchanger 20 through the heat medium pipe 26.

A heat medium cooler 46 is provided in the heat medium pipe 26 extending from the heat medium return tank 44 to the first heat exchanger 20. The heat medium cooler 46 of this embodiment is a heat exchanger, and performs the heat exchange between the heat medium in the heat medium pipe 26 extending from the heat medium return tank 44 to the first heat exchanger 20 and a coolant supplied to the heat medium cooler 46 from the outside, and thereby lowers a temperature of the heat medium.

By the heat medium cooler 46, the heat medium flowing into the first heat exchanger 20 can be maintained at a predetermined temperature, and accordingly, the heat exchange in the first heat exchanger 20 can be performed stably, and the charge/discharge efficiency can be enhanced. The charge/discharge efficiency is obtained by dividing the generated power generated by the generator 30 by the input power supplied to the motor 32.

In the heat medium path, pumps 48a and 48b for making the heat medium flow in the heat medium pipe 26 are provided. In this embodiment, the pumps 48a and 48b are provided downstream of the first heat exchanger 20 and upstream of the second heat exchanger 24, respectively. However, positions of the pumps 48a and 48b are not limited to these, and the pumps 48a and 48b may be provided at arbitrary positions in the heat medium path. Moreover, the number of pumps 48a and 48b is not limited to two, and may be one or three or more.

As described above, the heat medium path of the CAES power generation device 2 is configured.

Moreover, the CAES power generation device 2 includes control devices 50a and 50b. The control devices 50a and 50b are constructed of hardware including a sequencer and the like, and of software implemented therein. The control device 50a is electrically connected to at least the motor 32 and the power plant 6 (see the alternate long and short dashed line in FIG. 1). The control device 50b is electrically connected to at least the generator 30 and the power system 4 (see the alternate long and short dashed line in FIG. 1). Hence, operations of these are controlled by the control devices 50a and 50b. The pressure sensor 14 outputs a measured value to the control devices 50a and 50b. The control devices 50a and 50b control the CAES power generation device 2 based on this measured value. In this embodiment, the control devices 50a and 50b are provided separately as the control device 50a that controls functions related to the compression and as the control device 50b that controls functions related to the expansion; however, a single control device that controls both of the functions may be provided.

The control device 50a detects the pressure of the accumulator tank 12 by the pressure sensor 14. Moreover, from an SOC (State of Charge) corresponding to the detected pressure, and from a required charge amount signal Lc required from the power plant 6, the control device 50*a* determines an amount of power to be absorbed from the power plant 6, and gives a rotation speed command to the motor (electric motor) 32 of the compressor 10 via the inverter 36. This rotation speed command exceeds a rated rotation speed of the motor 32 in some cases; however, does not exceed a maximum permissible rotation speed of the motor 32.

The control device 50*b* detects the pressure of the accumulator tank 12 by the pressure sensor 14. From an SOC corresponding to the pressure thus detected, and from a required discharge amount signal Lg required from the power system 4, the control device 50*b* determines an amount of power to be discharged the power system 4, and gives a rotation speed command to the generator 30 of the expander 16 via the converter 38. This rotation speed command exceeds a rated rotation speed of the generator 30 in some cases; however, does not exceed a maximum permissible rotation speed of the generator 30.

For the SOC of the accumulator tank 12, a reference storage value indicating that the SOC is in a predetermined intermediate state is set. The predetermined intermediate state indicates a state in which an air storage amount of the accumulator tank 12 is appropriate and a predetermined input or output, which is capable of an efficient operation, is exerted. In this embodiment, the SOC corresponds to a pressure value, and accordingly, the reference storage value indicating that the SOC is in the predetermined intermediate state is also a numeric value corresponding to the pressure value. However, the SOC is not limited to the pressure value, and hence, the reference storage value is not limited to the pressure value, either. For these, arbitrary ones can be used as long as the storage amount of the accumulator tank 12 can be determined thereby. Setting of the reference storage value will be described later. Moreover, the rotation speed commands given from the control devices 50*a* and 50*b* to the motor 32 and the generator 30 are set so that the motor 32 and the generator 30 can rotate at the rated rotation speeds at the reference storage value. The motor 32 and the generator 30 are controlled so as to rotate at the rated rotation speed or less when the SOC is larger than the reference storage value, and to rotate at the rated rotation speed or more and the maximum permissible rotation speed or less when the SOC is smaller than the reference storage value.

Expansion power of the expander 16, which corresponds to the power generation output of the generator 30, is determined by a product of expansion torque of the expander 16 and the rotation number thereof. When the SOC decreases due to the discharge, a differential pressure between an internal pressure of the accumulator tank 12 and the atmospheric pressure decreases with the lapse of time, and the expansion torque also decreases. Hence, in order to constantly maintain the expansion power, the rotation speed just needs to be increased inversely proportionally with respect to the decrease of the expansion torque. Moreover, in order to constantly maintain the expansion power with respect to the increase of the SOC, the rotation speed just needs to be decreased inversely proportionally with respect to the increase of the expansion torque. As described above, the rotation of the expander 16 is changed inversely proportionally with respect to the change of the SOC, whereby constant expansion power is obtained in a wide range of the SOC, and a predetermined rated output of the generator 30 can be maintained. Moreover, likewise for the control of the compressor 10 as well as the expander 16, the rotation of the compressor 10 is changed inversely proportionally with respect to the change of the SOC, whereby constant compression power is obtained in a wide range of the SOC, and a predetermined rated input of the motor 32 can be maintained.

As described above, in the case of smoothing the renewable energy, even when the SOC fluctuates from the reference storage value, the rotation speed of the motor 32 or the generator 30 is controlled by the control device 50*a* or 50*b*, whereby the rated input or the rated output can be maintained within a constant range. That is, a pressure range of the accumulator tank 12 that can be operated at a predetermined rated input or rated output can be expanded, and accordingly, the charge/discharge efficiency of the whole of the system can be highly maintained. In general, a rotating electric instrument (rotating electric machine) for use in the motor 32 or the generator 30 is designed so that efficiency thereof can be improved in a rated state, and accordingly, for enhancing the efficiency, it is effective to expand an operation range at the predetermined rated input or rated output.

From a viewpoint of enhancing the charge/discharge efficiency, it is preferable to operate the motor 32 at the predetermined rated input and operate the generator 30 at the predetermined rated output as described above. Specifically, the operation at the predetermined rated input refers to an operation in which the amount of power to be absorbed (charged) by the required charge amount signal Lc from the power plant 6 is maintained at a predetermined rated value. The operation at the predetermined rated output refers to an operation in which the amount of power to be generated (discharged) by the required discharge amount signal Lg from the power system 4 is maintained at a predetermined rated value.

"Reference storage value" just needs to be set at an appropriate value between a maximum capacity (equivalent to SOC=100%) at which the air is storable in the accumulator tank 12 and a minimum capacity (equivalent to SOC=0%) at which the power is generatable. If the SOC taken as the reference storage value is made too large or too small, then a time of operating the motor 32 and the generator 30 out of the rating is increased, and the charge/discharge efficiency is decreased as a whole. Moreover, the range of SOC where the rated input or the rated output can be maintained is decreased. Hence, it is preferable to set the SOC taken as the reference storage value to approximately 50% to 75%. In this embodiment, SOC=66% is set as the reference storage value. Regarding the storage value, it is easiest to use the a detected value of the pressure in the accumulator tank 12 by using the pressure sensor 14; however, a calculated value, which is calculated by integrating an air inflow amount to the accumulator tank 12 and an air outflow amount from the accumulator tank 12 by using a flow rate sensor (not shown), and the like may be used.

Hereinafter, specific examples of the control of the control devices 50*a* and 50*b* will be described with reference to FIG. 2 to FIG. 6.

Figure 2:
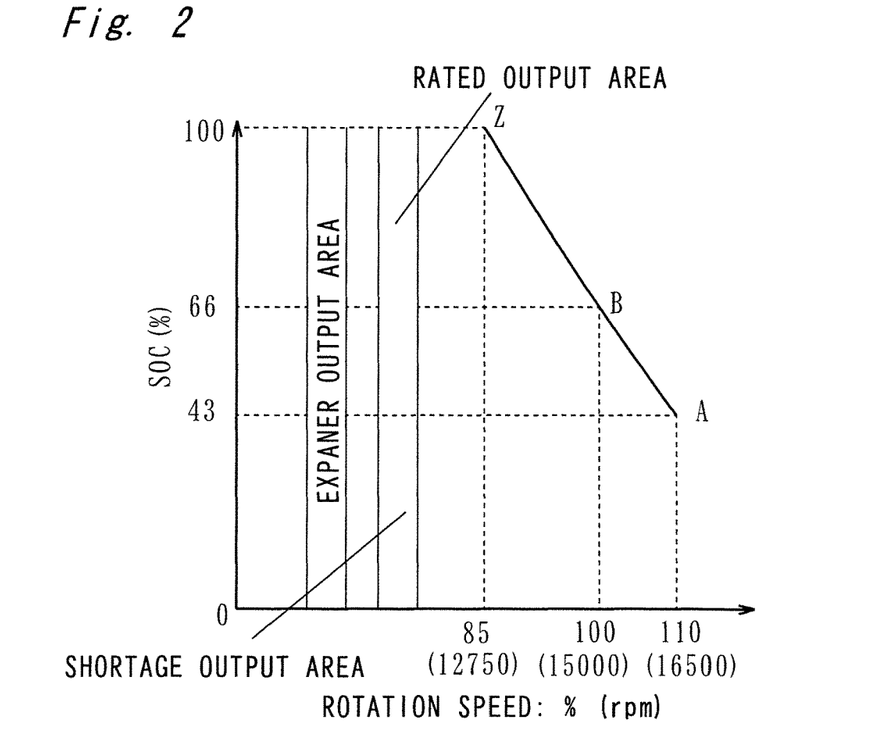
FIG. 2 is a graph showing a relationship between a rotation speed of an expander and an SOC.

FIG. 2 is a graph showing a relationship between the rotation speed of the expander 16 and the SOC. An axis of ordinates of the graph indicates the SOC (%), and an axis of abscissas thereof indicates the rotation speed (rpm) of the expander 16.

Figure 3:
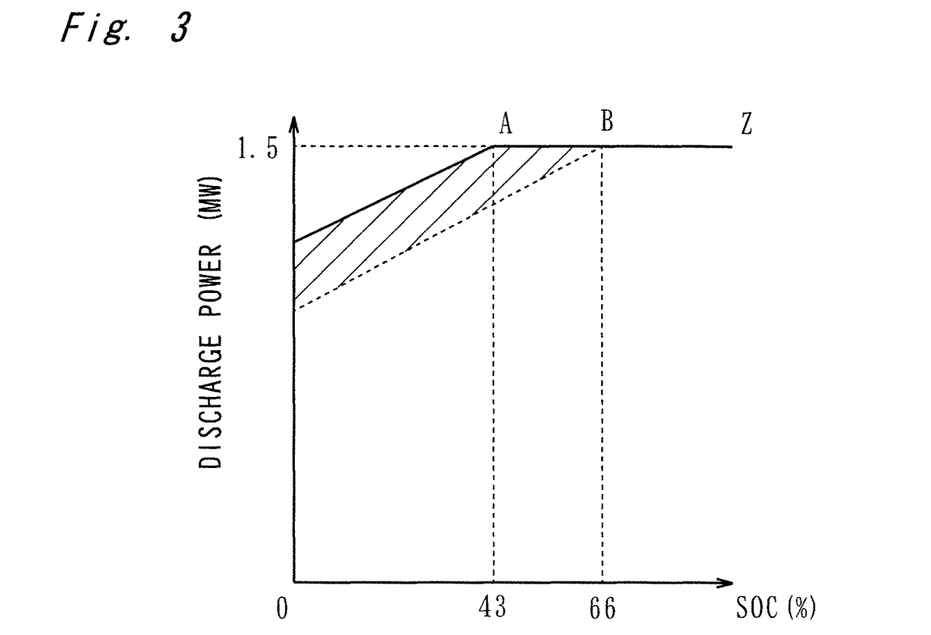
FIG. 3 is a graph showing a relationship between maximum discharge power and the SOC.

Referring to FIG. 2, a point B is a rated point of the generator 30 mechanically connected to the expander 16. The point B is in a rated state in which the expander 16 operates at a rated rotation speed of 15000 rpm, and in a vicinity of the point B, the charge/discharge efficiency of the whole of the system is maximized. In this embodiment, a point of SOC=66% is set as the rated point, and this point is taken as the reference storage value of the accumulator tank 12 in the control of the expander 16. Moreover, in this embodiment, SOC=100% is set to correspond to 0.93 MPa, and SOC=0% is set to correspond to 0.3 MPa; however, the present invention is not limited to this. The expander 16 and the generator 30 are connected to each other via a speed increasing gear, and the rated rotation speed of the generator 30 is approximately a half of the rated rotation speed of the expander 16. Moreover, as shown in FIG. 3, a rated output of 1.5 MW is exerted at the point B.

When the compressed air is supplied into the accumulator tank 12 from the state of the point B, and the SOC rises, then the rotation of the generator 30 falls below the rated rotation speed (15000 rpm), and the rotation speed is decelerated to a point Z (SOC=100%) at which the rotation speed is 12750 rpm (85% of the rated rotation speed). As shown in FIG. 3, discharge power at the point Z is 1.5 MW (rated output), and the rated output is maintained during transition from the point B to the point Z.

When the compressed air in the accumulator tank 12 is used from the state of the point B, and the SOC decreases, then the rotation of the generator 30 exceeds the rated rotation speed (15000 rpm), and the rotation speed is accelerated to a point A (SOC=43%) at which the rotation speed is the maximum permissible rotation speed of 16500 rpm (110% of the rated rotation speed). As shown in FIG. 3, discharge power at the point A is 1.5 MW (rated output), and the rated output is maintained during a shift from the point B to the point A.

Hence, in FIG. 2, a region on a left side of the reference storage value (SOC=66%) at the point B is a decreased rotation speed region with respect to the rated rotation speed of the generator 30, and a region on a right side thereof is an increased rotation speed region. As described above, the rotation of the generator 30 is increased and decreased with respect to the rated rotation speed in response to the rise and decrease of the SOC, and the expansion power is constantly maintained as shown in FIG. 3, and accordingly, the state of the SOC can be shifted in a range between the point Z and the point A in the state in which the discharge power is maintained at the rated output of 1.5 MW.

In FIG. 2, when a region on a right side of the point Z is viewed, the rated output at SOC=100% is already obtained at the point Z, and accordingly, it is not necessary to accelerate the rotation of the generator 30 any more. Moreover, when a region on a right side of the point A is viewed, the rotation speed has already reached the maximum permissible rotation speed at the point A, and accordingly, the rotation speed is not accelerated any more, and the expander 16 continues to be operated at the maximum permissible rotation speed of 16500 rpm. In this case, the rated output of 1.5 MW cannot be maintained, and the discharge power gradually decreases as indicated by a solid slanted line extending from the point A in FIG. 3. A broken slanted line extending from the point B in FIG. 3 indicates a decrease of the discharge power in the case where such control as in this embodiment is not performed. As described above, in FIG. 3, the range of the SOC in which the rated output can be exerted is expanded by an area of a hatched portion.

In this embodiment, the reference storage value is set so that such a rated state can be achieved at SOC=66%; however, may be set so that the rated state can be achieved at other values of the SOC. When the rated point is set too high, the value of the SOC reaching the maximum permissible rotation speed is increased, and the SOC range where the rated output can be exerted in the CAES power generation device 2 is decreased. Moreover, in that case, there is little room to SOC=100% from the rated point where the maximum efficiency can be exerted, and accordingly, if the absorption (charge) is required continuously, then there is a possibility that the accumulator tank 12 may be full, and a low response ability is brought about. However, when the SOC exceeds 100%, the CAES power generation device 2 according to this embodiment discharges the compressed air by the compressor 10 to the outside through an air pipe (not shown) without passing via the accumulator tank 12, and can thereby absorb the power even if the SOC exceeds 100%. When the rated point is set too low, a time while the discharge can be performed continuously is shortened.

Figure 4:
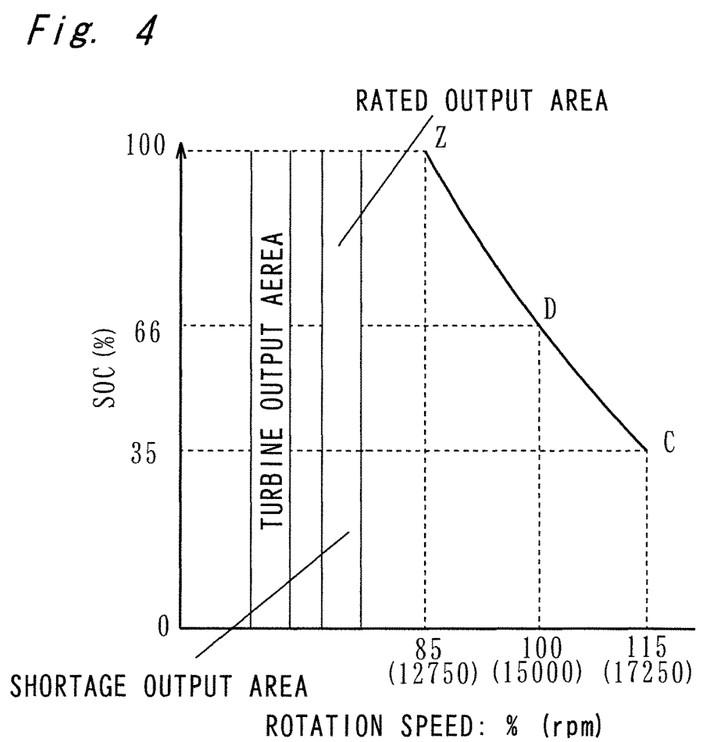
FIG. 4 is a graph showing a relationship between a rotation speed of a compressor and the SOC.

FIG. 4 shows a relationship between the rotation speed of the compressor 10 and the SOC. An axis of ordinates of the graph indicates the SOC (%), and an axis of abscissas thereof indicates the rotation speed (rpm) of the expander 16.

Referring to FIG. 4, a point D is a rated point of the motor 32 mechanically connected to the compressor 10. The point D is in a rated state in which the compressor 10 operates at a rated rotation speed of 15000 rpm, and in a vicinity of the point D, the charge/discharge efficiency of the whole of the system is maximized. In this embodiment, a point of SOC=66% is set as the rated point, and this point is taken as the reference storage value of the accumulator tank 12 in the control of the compressor 10. Moreover, in this embodiment, the reference storage values of both of the expander 16 on the power generation side and the compressor 10 on the charge side are set to SOC=66%, which is the same value therebetween. However, it is not necessary to set the reference storage values on the power generation side and the charging side to the same value, and the reference storage values may be changed to values different from each other in response to characteristics of the generator 30 and the motor 32 and the whole of the system.

Figure 5:
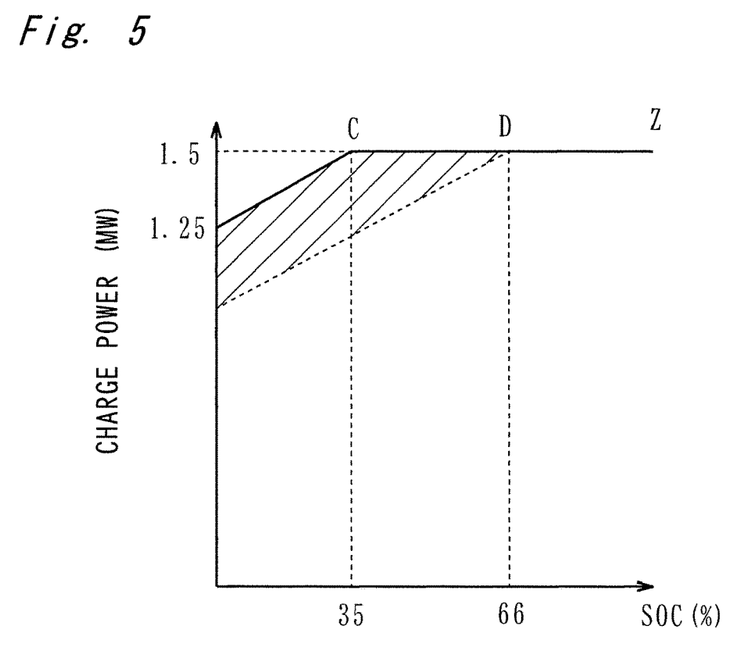
FIG. 5 is a graph showing a relationship between maximum charge power and the SOC.

When the compressed air is supplied into the accumulator tank 12 from the state of the point D, and the SOC rises, then the rotation of the motor 32 falls below the rated rotation speed (15000 rpm), and the rotation speed is decelerated to such a point Z (SOC=100%) at which the rotation speed is 12750 rpm (85% of the rated rotation speed). As shown in FIG. 5, charge power at the point Z is 1.5 MW (rated output), and the rated input is maintained during a shift from the point D to the point Z.

When the compressed air in the accumulator tank 12 is used from the state of the point D, and the SOC decreases, then the rotation of the motor 32 exceeds the rated rotation speed (15000 rpm), and the rotation speed is accelerated to such a point C (SOC=35%) at which the rotation speed is the maximum permissible rotation speed of 17250 rpm (115% of the rated rotation speed). As shown in FIG. 5, charge power at the point C is 1.5 MW (rated output), and the rated input is maintained during a shift from the point D to the point C.

Hence, in FIG. 4, a region on a left side of the reference storage value (SOC=66%) at the point D is a decreased rotation speed region with respect to the rated rotation speed of the motor 32, and a region on a right side thereof is an increased rotation speed region. As described above, the rotation of the motor 32 is increased and decreased with respect to the rated rotation speed in response to the rise and decrease of the SOC, and the compression power is constantly maintained as shown in FIG. 5, and accordingly, the state of the SOC can be shifted in a range between the point Z and the point C in the state in which the charge power is maintained at the rated input of 1.5 MW.

In FIG. 4, when a region on a left side of the point Z is viewed, SOC=100% is already obtained at the point Z, and accordingly, the compressed air cannot be supplied to the accumulator tank 12 any more. Moreover, when a region on a right side of the point C is viewed, the rotation speed has already reached the maximum permissible rotation speed at the point C, and accordingly, the rotation speed is not accelerated any more, and the motor 32 continues to be operated at the maximum permissible rotation speed of 17250 rpm. Even when the motor 32 is rotated at the maximum permissible rotation speed, the pressure in the accumulator tank 12 is low, and accordingly, a load corresponding to torque at a rating time does not occur, and a power consumption of the motor 32 cannot reach a rated power consumption. Hence, as shown in FIG. 5, the charge power does not reach the rated input of 1.5 MW, and no more than approximately 1.25 MW thereof can be consumed (absorbed). In this case, the rated input of 1.5 MW cannot be maintained, and the charge power gradually decreases as indicated by a solid slanted line extending from the point C in FIG. 5. A broken slanted line extending from the point D in FIG. 5 indicates a decrease of the charge power in the case where such control as in this embodiment is not performed. As described above, in FIG. 5, the range of the SOC in which the rated input can be exerted is expanded by an area of a hatched portion.

In the case of this embodiment, it is assumed that a general-purpose compressor of a displacement type and a general-purpose expander of a displacement type, which are widely distributed in Japan, are used, and accordingly, SOC=100% is set to 0.93 MPa; however, may be set to a higher pressure. In this way, the capacity of the accumulator tank 12 can be reduced.

Figure 6:
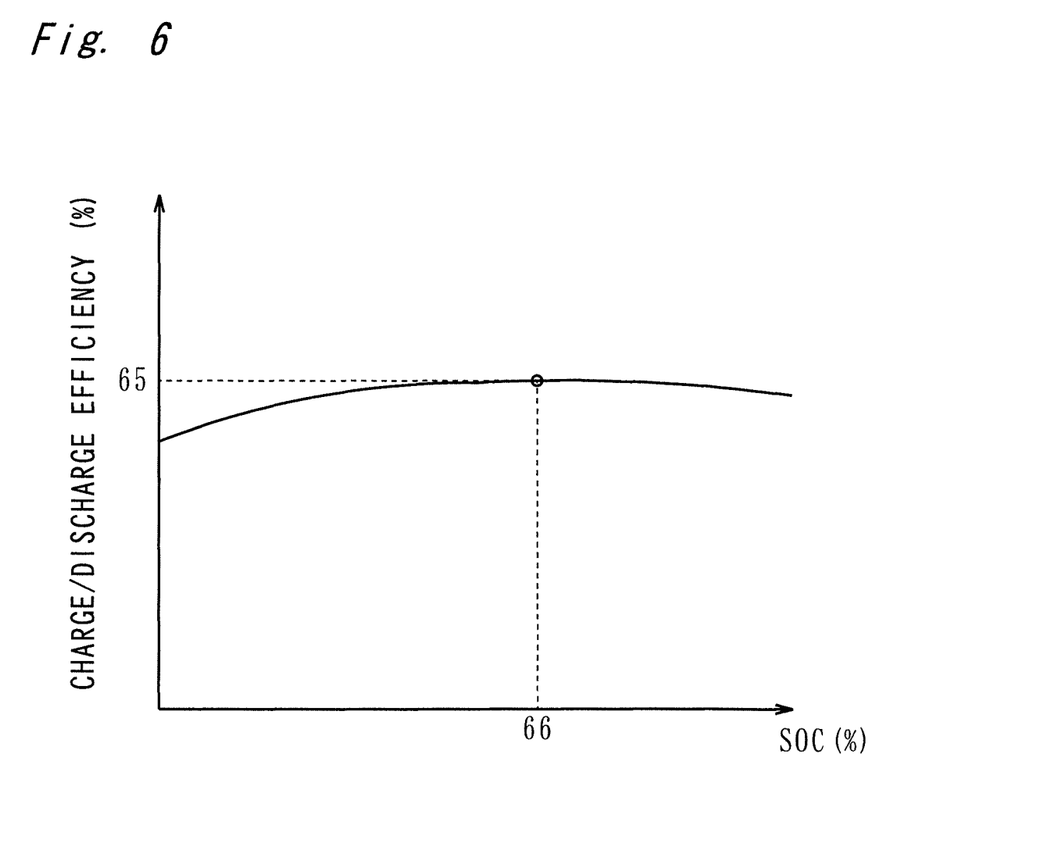
FIG. 6 is a graph showing a relationship between the SOC and charge/discharge efficiency.

FIG. 6 is a graph showing a relationship between the charge/discharge efficiency of the whole of the CAES power generation device 2 and the SOC. An axis of ordinates of the graph indicates the charge/discharge efficiency (%), and an axis of abscissas indicates the SOC (%). The charge/discharge efficiency is one of indicators indicating the performance of the CAES power generation device 2. As shown in FIG. 6, a point indicating the maximum charge/discharge efficiency (approximately 65% in FIG. 6) is a point of SOC=66%. This indicates that the rated points of the generator 30 and the motor 32 are set at this point. In fact, the charge/discharge efficiency is not maximized at the rated points of the generator 30 and the motor 32 in some cases since there are also influences of efficiency of the heat exchangers 20 and 24 and other instruments when the whole of the system is viewed; however, the charge/discharge efficiency is maximized roughly in the vicinities of the rated points of the generator 30 and the motor 32.

However, when the accumulator tank 12 becomes full, it becomes impossible for the accumulator tank 12 to accumulate any more pressure, and accordingly, in usual, the CAES power generation device 2 is operated in a state in which there is room in the accumulator tank 12. For example, the CAES power generation device 2 may be allowed to operate in a state in which the pressure in the accumulator tank 12 is lower than the discharge pressure of the compressor 10. It becomes impossible to generate power when the accumulator tank 12 becomes empty, and accordingly, the CAES power generation device 2 operates in a state in which there is a certain remaining amount in the accumulator tank 12. For example, the CAES power generation device 2 may be allowed to operate while maintaining the pressure in the accumulator tank 12 at equal to or more than a pressure at which a differential pressure necessary to drive the expander 16 is generatable. Strictly speaking, even if the SOC falls below 0%, if just a small amount of the pressure remains in the accumulator tank to an extent of being suppliable to the expander, then the power generation is possible. However, this leads to a decrease of the charge/discharge efficiency and also a deterioration of controllability, and accordingly, it is preferable not to use a region where the SOC is equal to or less than 0% (SOC=0% or less). When the discharge power may be equal to or less than the rated output, such a region on a left side or lower side of a line A-B-Z in the graph in FIG. 2 is used, and when the charge power may be equal to or less than the rated input, such a region on a left side or lower side of a line C-D-Z in the graph in FIG. 4 is used.

Second Embodiment

Figure 7:
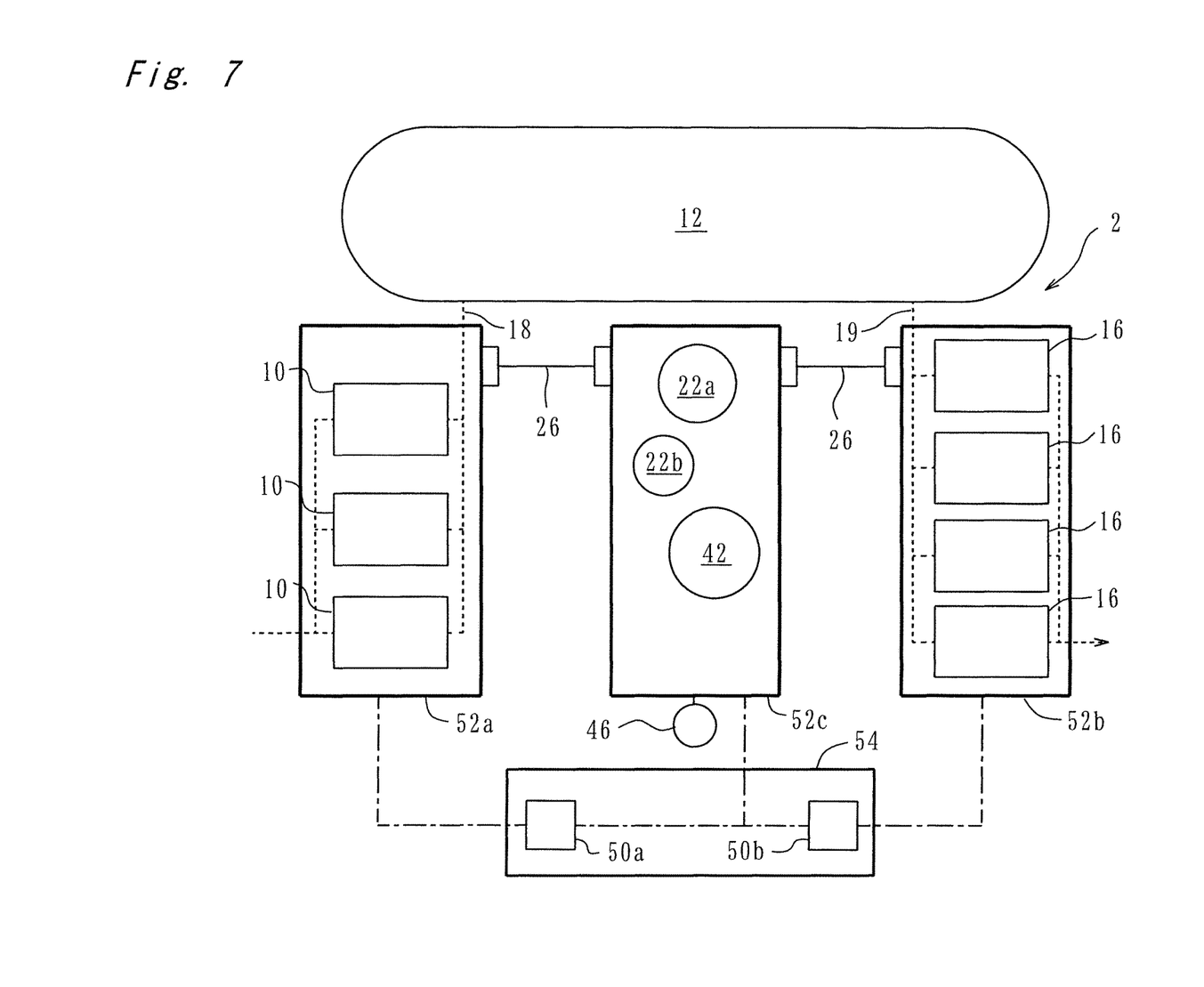
FIG. 7 is a schematic diagram according to a second embodiment of the present invention.

FIG. 7 shows a schematic diagram of a CAES power generation device 2 of a second embodiment. The CAES power generation device 2 of this embodiment is substantially similar to that of the first embodiment in FIG. 1 except that pluralities of the compressors 10, the expanders 16 and heat medium tanks 22a and 22b are installed, and that such constituents are housed in containers 52a to 52c. Hence, a description of portions similar to those shown in FIG. 1 will be omitted. Moreover, since FIG. 7 is a schematic diagram, not all constituents of the CAES power generation device 2 are illustrated.

Referring to FIG. 7, the CAES power generation device 2 of this embodiment includes three compressors 10 and four expanders 16. The three compressors 10 are fluidly connected in parallel to one another, and the four expanders 16 are also fluidly connected in parallel to one another. The number of compressors 10 and the number of expanders 16, which are to be driven, can be changed in response to the input power and the demand power, and accordingly, it is possible to perform wide and efficient smoothing. Moreover, the compressors 10, the expanders 16 and the accumulator tank 12 are coupled to one another by the air pipes 18 and 19, and the compressors 10, the expanders 16, and the heat medium tanks 22a and 22b and the heat medium return tank 44 are coupled to one another by the heat medium pipe 26. The control devices 50a and 50b are housed in a house 54.

Each of the compressors 10 and the expanders 16 is inverter-controllable, that is, is capable of controlling a rotation speed thereof. However, not only the inverter-controllable compressors 10 and expanders 16, but also several inverter-incontrollable compressors 10 and expanders 16 may be incorporated.

The CAES power generation device 2 of this embodiment includes a high-temperature heat medium tank 22a and a low-temperature heat medium tank 22b, and the heat medium subjected to the heat exchange in the first heat exchanger 20 is stored separately for each temperature. Hence, in the second heat exchanger 24, the heat exchange is performed at heat medium temperatures corresponding to necessity, and accordingly, the discharge efficiency is enhanced.

In this embodiment, most of the constituents of the CAES power generation device 2 are housed in containers 52a to 52c. In particular, three containers 52a to 52c are installed while being divided as the container 52a related to such a compression function including the compressors 10 and the first heat exchanger 20 and the like (not shown), the container 52b related to such an expansion function including the expanders 16 and the second heat exchangers 24 and the like (not shown), and the container 52c related to such a heat storage function including the heat medium tank 22 and the like. The constituents are housed in the containers 52a to 52c as described above, whereby installation cost in the case of installing the CAES power generation device 2 can be suppressed to a large extent. In this embodiment, the heat medium cooler 46 is disposed as a cooling tower on an outside of the container 52c.

Moreover, each of the compressors 10 on the charge side and the expanders 16 on the discharge side has a capacity of approximately 500 kW. A charge/discharge unit is composed of the containers 52a to 52c, whereby it becomes easy to transport and install the charge/discharge unit, and a facility capacity can be freely increased and decreased. For example, if six sets, each of which includes these three containers 52a to 52c, are installed, then a facility with 3 MW as a whole can be constructed.

As in this embodiment, when the plurality of compressors 10 or expanders 16 are provided and operated in parallel to one another, it is preferable to perform control so that the number of compressors 10 or expanders 16 to be operated in the vicinity of the rated point can be increased as much as possible. In comparison with such a configuration as in the first embodiment, which is composed of the single compressor 10 and the single expander 16, those which are general-purpose and each have a relatively small capacity can be used, and accordingly, cost of the whole of the system can be suppressed. Moreover, in general, smaller compressors or expanders have better responsiveness than larger compressors or expanders, and accordingly, responsiveness of the whole of the system can be enhanced.

Throughout the first and second embodiments, "fluctuating input power" of the present invention is not limited to such renewable energy, but may be one that smoothes demand power of a factory facility or performs a peak cut therefor.

The invention claimed is:

1. A compressed air energy storage and power generation method, comprising:
    driving an electric motor by fluctuating input power;
    compressing air by a compressor mechanically connected to the electric motor;
    storing the compressed air, which is supplied from the compressor, in an accumulator tank;
    driving an expander by the compressed air supplied from the accumulator tank; and
    generating power by a generator mechanically connected to the expander;
    defining, as a reference storage value, a storage value indicating that a storage amount of the air in the accumulator tank is in a predetermined intermediate state;
    when a storage value indicating a current storage amount in the accumulator tank is at the reference storage value, controlling at least one of the electric motor and the generator to rotate at a rated rotation speed;
    when the storage value indicating the current storage amount in the accumulator tank is larger than the reference storage value, controlling the electric motor to rotate at less than the rated rotation speed so as to maintain a rated input, and
    when the storage value indicating the current storage amount in the accumulator tank is smaller than the reference storage value, controlling the electric motor to rotate at more than the rated rotation speed and less than a maximum permissible rotation speed so as to maintain the rated input.

2. The compressed air energy storage and power generation method according to claim 1, wherein a maximum capacity at which the air is storable in the accumulator tank is defined as 100%, a minimum capacity at which power is generatable by the compressed air stored in the accumulator tank is defined as 0%, and the reference storage value is set within a range of 50% to 75% of the maximum capacity.

3. The compressed air energy storage and power generation method according to claim 1, wherein
    heat exchange is performed between a heat medium and the compressed air, which is compressed by the compressor, in a first heat exchanger, and a temperature of the heat medium is raised;
    the heat medium whose temperature is raised in the first heat exchanger is stored in a heat medium tank; and
    in a second heat exchanger, the heat exchange is performed between the heat medium supplied from the heat medium tank and the compressed air supplied from the accumulator tank, and a temperature of the compressed air is raised, and is supplied to the expander.

4. The compressed air energy storage and power generation method according to claim 3, wherein a maximum capacity at which the air is storable in the accumulator tank is defined as 100%, a minimum capacity at which power is generatable by the compressed air stored in the accumulator tank is defined as 0%, and the reference storage value is set within a range of 50% to 75% of the maximum capacity.

5. A compressed air energy storage and power generation device comprising:
    an electric motor driven by fluctuating input power;
    a compressor that is mechanically connected to the electric motor and compresses air;
    an accumulator tank that is fluidly connected to the compressor and stores the air compressed by the compressor;
    an expander that is fluidly connected to the accumulator tank and is driven by the compressed air supplied from the accumulator tank;
    a generator that is mechanically connected to the expander and generates power to be supplied to a demand destination; and
    a controller that defines, as a reference storage value, a storage value indicating that a storage amount of the air in the accumulator tank is in a predetermined intermediate state, wherein
    when a storage value indicating a current storage amount in the accumulator tank is at the reference storage value, the controller is configured to control at least one of the electric motor and the generator to rotate at a rated rotation speed,
    when the storage value indicating the current storage amount in the accumulator tank is larger than the reference storage value, the controller is configured to control the electric motor to rotate at less than the rated rotation speed so as to maintain a rated input, and
    when the storage value indicating the current storage amount in the accumulator tank is smaller than the reference storage value, the controller is configured to control the electric motor to rotate at more than the rated rotation speed and less than a maximum permissible rotation speed so as to maintain the rated input.

6. The compressed air energy storage and power generation device according to claim 5, wherein the controller defines a maximum capacity at which the air is storable in the accumulator tank as 100%, defines a minimum capacity at which power is generatable by the compressed air stored in the accumulator tank as 0%, and sets the reference storage value within a range of 50% to 75% of the maximum capacity.

7. The compressed air energy storage and power generation device according to claim 5, further comprising:
- a first heat exchanger for performing heat exchange between a heat medium and the compressed air compressed by the compressor, and raising a temperature of the heat medium;
- a heat medium tank that stores the heat medium whose temperature is raised in the first heat exchanger; and
- a second heat exchanger for performing the heat exchange between the heat medium supplied from the heat medium tank and the compressed air supplied from the accumulator tank, raising a temperature of the compressed air, and supplying the air to the expander.

* * * * *